US006286838B1

(12) United States Patent
Krüger et al.

(10) Patent No.: US 6,286,838 B1
(45) Date of Patent: Sep. 11, 2001

(54) PROCESS AND DEVICE FOR SEALING A ROTOR FOR LABORATORY CENTRIFUGES

(75) Inventors: Helmut Krüger; Viktor Betke, both of Osterode; Frank Eigemeier, Osterode-Dorste, all of (DE)

(73) Assignee: Kendro Labatory Products GmbH, Hanau (DE)

( * ) Notice: Subject to any disclaimer, the term of this patent is extended or adjusted under 35 U.S.C. 154(b) by 0 days.

(21) Appl. No.: 09/151,079

(22) Filed: Sep. 10, 1998

(30) Foreign Application Priority Data

Sep. 15, 1997 (DE) ............................................. 197 40 270
Feb. 25, 1998 (DE) ............................................. 198 07 668

(51) Int. Cl.[7] ............................... F16J 15/32; B04B 9/14; B04B 3/08

(52) U.S. Cl. .......................... 277/549; 277/567; 277/572; 73/1.87; 494/38

(58) Field of Search ................................. 494/16, 38, 39, 494/40, 41; 73/1.87; 277/549, 567, 572, 644, 647

(56) References Cited

U.S. PATENT DOCUMENTS 3,768,819 * 10/1973 Burkert .
4,054,243 * 10/1977 Volkov et al. ......................... 233/11
4,202,487 5/1980 Edwards ....................................... 7/2
4,342,419 * 8/1982 Conway ................................... 233/1
4,434,909 * 3/1984 Ott .
4,692,136 * 9/1987 Feldman et al. ........................ 494/38
4,877,272 * 10/1989 Chevallier et al. .
5,242,370 * 9/1993 Silver et al. ........................... 494/11
5,306,021 * 4/1994 Morvant ............................... 277/188
5,562,823 * 10/1996 Reeves ................................. 210/243
5,641,085 * 6/1997 Lonbardo .
5,692,758 * 12/1997 Wikstrom ............................. 277/165
5,833,245 * 11/1998 Gallagher ............................. 277/549
5,897,483 * 4/1999 Koch et al. ............................ 494/14

FOREIGN PATENT DOCUMENTS 2907001 8/1979 (DE) .

* cited by examiner

*Primary Examiner*—Anthony Knight
*Assistant Examiner*—Vishal Patel
(74) *Attorney, Agent, or Firm*—Workman, Nydegger & Seeley

(57) ABSTRACT

A rotor assembly for a laboratory centrifuge includes a rotor body having a loading region encircled by an annular first bearing surface. A lid is configured to be removably secured to the rotor body so as to substantially cover the loading region. The lid includes an annular second bearing surface. Disposed between the lid and the rotor body when the two are secured together is an annular sealing element. The sealing element has a substantially U-shaped transverse cross section and includes an outward facing annular base. An annular first sealing lip projects inward from the upper end of the base and is biased in sealed engagement with the second bearing surface of the lid. An annular second sealing lip projects inward from the lower end of the base and is biased in sealed engagement with second bearing surface of the rotor body. An annular collecting groove is formed on the sealing element between the first sealing lip and the second sealing lip. The base is supported by an annular jacket flange formed on the perimeter of the rotor assembly.

19 Claims, 7 Drawing Sheets

PROCESS AND DEVICE FOR SEALING A ROTOR FOR LABORATORY CENTRIFUGES

The present application claims priority to German Patent Application No. 198 07 668.1, filed Feb. 25, 1998, which claims priority to German Patent Application No. 197 40 270.4, filed Sep. 15, 1997, which, for purposes of disclosure, are incorporated herein by specific reference.

BACKGROUND OF THE INVENTION

1. The Field of Invention

The present invention relates to centrifuge rotors and, more specifically, centrifuge rotors which can be sealed closed so as to prevent accidental dispersion of material held within the rotor during operation of the centrifuge.

2. The Relevant Technology

Centrifuges are used in a variety of different environments for facilitating such services as separating substances of different densities, removing moisture from materials, and for simulating gravitational effects. A conventional laboratory centrifuge includes a rotor housing which is attached to the drive shaft of a motor. The rotor body is configured to receive test tubes which hold a desired substance. As the motor is operated, the rotor is rapidly spun so as to produce an increased gravitational affect on the substance within the test tubes. Where the substance is a solution, the elements of the solution are then separated by density.

To increase the operational safety of centrifuges, a lid is typically removably secured to the rotor body. Should a test tube accidentally fail, the lid helps to prevent parts of the test tube and/or the substance it contains from being thrown or dispersed into the surrounding environment. This is particularly important where the centrifuge is spinning a hazardous substances.

Although lids are helpful in containing the substance of failed test tubes, it is still possible for the spilled substance to seep out at the joint between the lid and the rotor body. To help prevent leaking at the joint, attempts have been made to position a seal between the lid and rotor housing. The seals, however, are often distorted and fail under the tremendous centrifugal force applied thereto In one attempt at incorporating a seal, German Patent No. 29 07 001 C2 and corresponding U.S. Pat. No. 4,202,487 disclose a rotor housing with a screw-on lid. A sealing O-ring is positioned along the periphery between the rotor housing and rotor lid so that the sealing action of the O-ring is reinforced when the centrifuge is in operation. That is, this arrangement generates a moment of rotation which produces a radial centrifugal force, and it also generates a sealing force in the axial direction. It thereby becomes possible to bring about a sealing with a reliable sealing action even if the lid is screwed on only loosely. Due to the construction of the rotor lid and the rotor housing, the O-ring is held in its correct position in order to obtain a favorable sealing during the centrifugation procedure.

Although useful, some problems have been shown to arise with the above arrangement. For example, O-rings require a relatively narrow tolerance range. In addition, the above assembly does not facilitate the collection of spilled fluids in the rotor.

OBJECTS AND BRIEF SUMMARY OF THE INVENTION

Accordingly, it is an object of the present invention to provide a rotor assembly which is sealable so as to retain liquid with high certainty in the rotor during centrifugation.

Another object of the present invention is to provide a rotor assembly as above, wherein the sealing effectiveness increases as the centrifugal force increases.

Yet another object of the present invention is to provide a rotor assembly as above which functions to collect spilled materials within the rotor.

Finally, another object of the present invention is to provide a rotor assembly as above which can be easily manufactured having relatively large tolerances.

To achieve the foregoing objects, and in accordance with the invention as embodied and broadly described herein, a sealable centrifuge rotor assembly is provided. The rotor assembly includes a rotor body having a loading region encircled by an annular first bearing surface. The loading region is formed having recesses configured to receive test tubes or other centrifugable containers. A lid is configured to be removably secured over the loading region of the rotor body. The lid has an annular second bearing surface.

The rotor assembly further includes an annular sealing element having a substantially U-shaped transverse cross-section. The sealing element includes an outwardly facing base. An annular first sealing lip projects inwardly and upwardly from the top end of the base. A second sealing lip projects inwardly and downwardly from the bottom end of the base. An annular collecting groove is formed on the inside face of the sealing element between the first sealing lip and the second sealing lip.

As the lid is secured to the rotor housing, the first sealing lip of the sealing element is biased in sealing engagement against the bearing surface of the lid. Likewise, the second sealing lip of the sealing element is biased in sealing engagement against the bearing surface of the rotor body. An annular jacket flange which projects from the lid and/or the rotor body is disposed against the outward facing surface of the base of the sealing element. In this position, the lid and rotor housing are sealed together when in an idle position.

During centrifugation, the jacket flange functions to hold the base of the sealing element in position. Simultaneously, the centrifugal force functions to spread the sealing lips apart from each other so that the sealing lips of the sealing element further bias against their corresponding bearing surface. Accordingly, the greater the centrifugal force, the greater the effective seal between the sealing lips and the bearing surfaces. Furthermore, the bearing surfaces of the lid and rotor body are angled so as to form a gap therebetween which narrows radially outward. Accordingly, as the sealing element is forced outward under the centrifugal force, the sealing element is compressed within the narrowing gap between the bearing surfaces, thereby further increasing the effective seal therebetween.

In one embodiment, the sealing element is constructed to be symmetrical when viewed in a transverse cross-section. As such, the sealing element is rotationally symmetrical. The simple handling of the sealing element due to its symmetric construction proves to be advantageous.

An additional advantage of the present invention is that the U-shaped collecting groove on the sealing element functions to collect liquids or other materials that may have spilled within the loading region without stressing the sealing gap. That is, as the liquid is collected between the sealing lips of the sealing element, the liquid is not being forced between the sealing lips and the bearing surfaces. As such, the potential for the substance seeping between the sealing lips and the bearing surfaces is minimized.

Furthermore, in an advantageous arrangement it is possible to divide the collecting groove of the sealing element into sectors by lamellar walls. In so doing, it is also possible to construct the recess in the sealing element in the form of borings in the radial direction.

In one embodiment, an annular inner flange extends from the lid and/or rotor housing such that the inner flange is adjacent to the inside face of the sealing element. In this embodiment, the outer face of the sealing element is bounded by the jacket flange and the inner face of the sealing element is at least partially bounded by the inner flange.

One of the advantages of the present invention is that it can be manufactured inexpensively. That is, as a result of the expandable nature of the sealing element, the rotor assembly can be manufactured from plastic parts having relatively large tolerances. Moreover, the symmetry of the sealing element allows its insertion without the risk of confusion. In addition, by way of example, it appears that liquid volumes up to about 0.5 ml can be retained within the collecting groove without stressing the sealing gap.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENT

Figure 1:
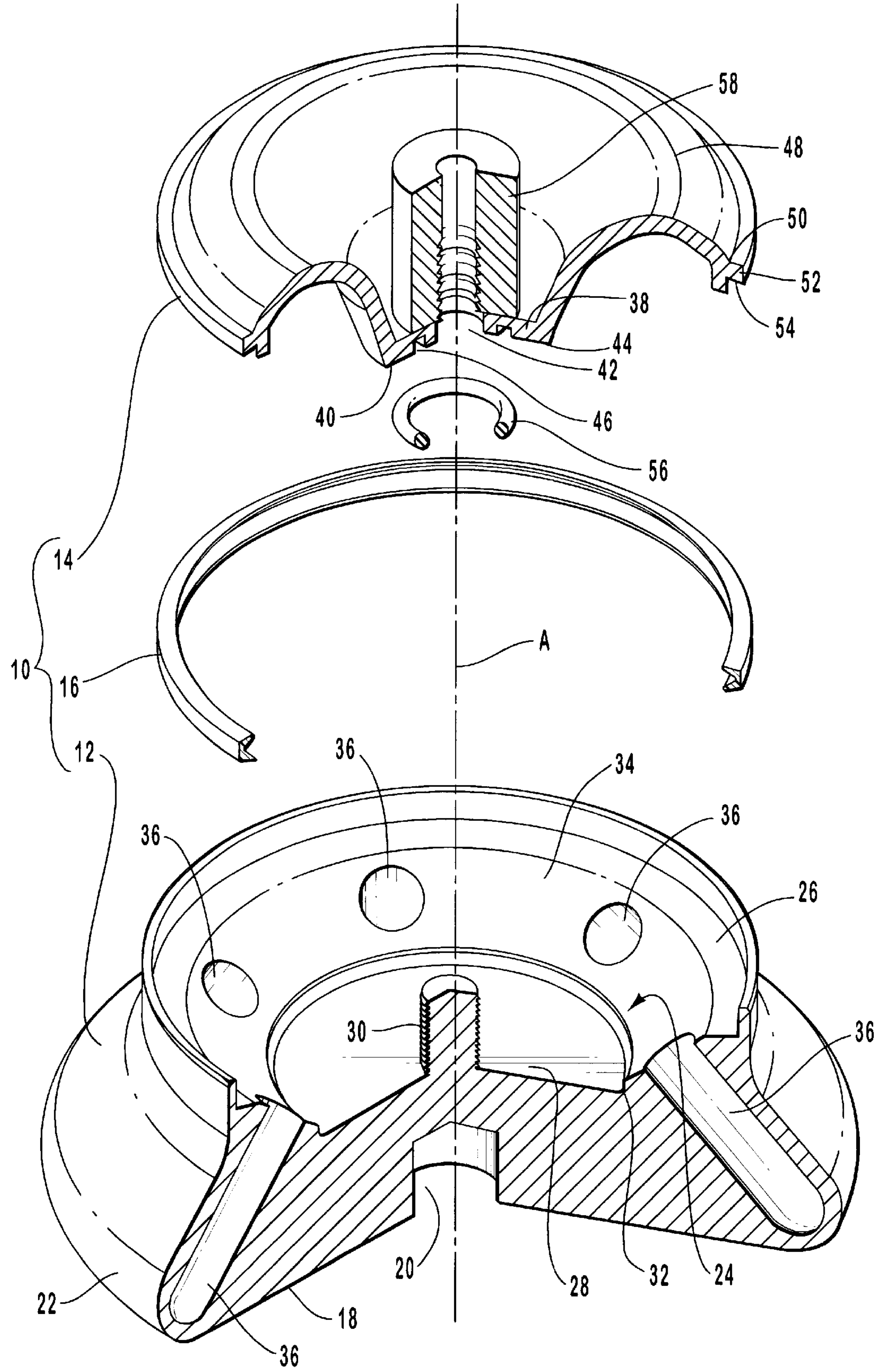
FIG. 1 is a partially cut away perspective view of a disassembled rotor assembly.

Depicted in FIG. 1 is an exploded view of one embodiment of an inventive centrifuge rotor assembly 10 incorporating features of the present invention. Rotor assembly 10 includes a rotor body 12, a lid 14, and a sealing element 16. Sealing element 16 functions to produce a liquid tight seal between lid 14 and rotor body 12 when lid 14 is attached to rotor body 12.

Rotor body 12 has a substantially flat bottom surface 18 that extends from a central recess 20 to a substantially circular outside perimeter 22. Central recess 20 is disposed along an axis of rotation “A” and is configured to receive and interlock a drive shaft of a motor which is not depicted. The combined motor and drive shaft function to facilitate centrifugal rotation of rotor body 12. Rotor body 12 further includes a loading region 24 which is encircled by an annular first bearing surface 26. Loading region 24 includes a substantially flat floor 28 extending from a threaded bolt 30 to an outside lip 32. An annular frusticonical shelf 34 extends from lip 32 to first bearing surface 26. Formed within shelf 34 are a plurality of spaced apart recesses 36. In one embodiment, recesses 36 are configured to receive test tubes. The test tubes can hold liquids or other materials to which it is desired to apply a centrifugal force.

Lid 14 is configured to be removably secured to rotor body 12 so as to selectively cover loading region 24. Lid 14 include a substantially flat platform 38 having a bottom surface 40 extending from a central aperture 42 to an inner edge 44. An annular grove 46 is recessed within bottom surface 40 and encircles aperture 42. Groove 46 is configured to receive an O-ring 56. Disposed above aperture 42 is a threaded nut 58. An annular arch-shaped cover 48 extends from inner edge 44 to an annular outer edge 50. An annular lip 52 projects outward from outer edge 50. Annular lip 52 has an annular second bearing surface 54 formed on the side thereof.

Figure 2:
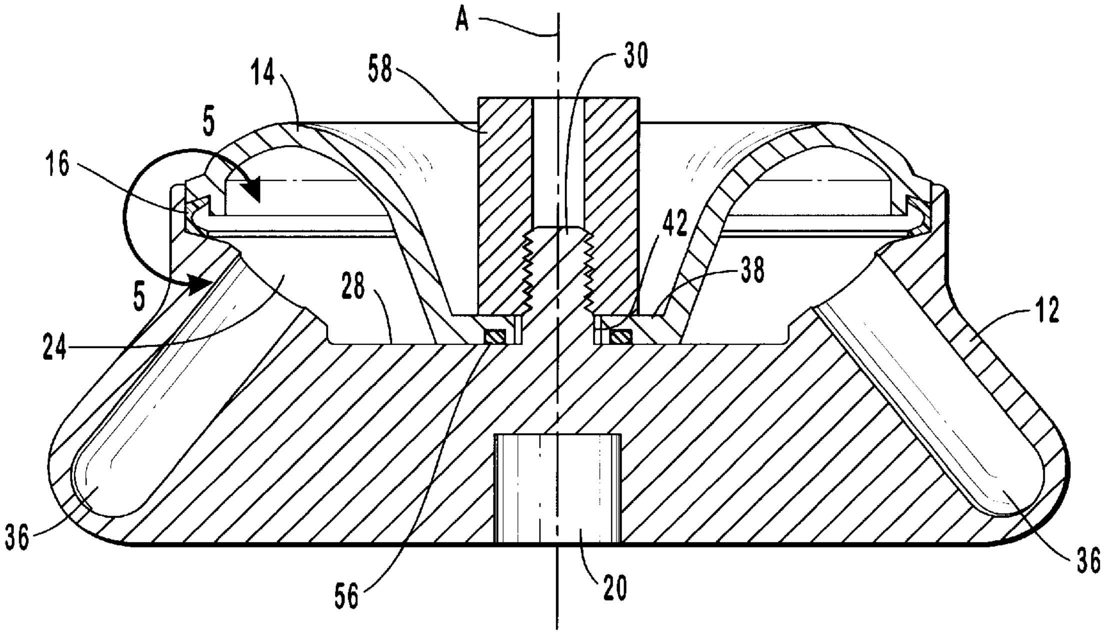
FIG. 2 is a cross-sectional side view of the assembled rotor assembly depicted in FIG. 1.

During assembly, as depicted in FIG. 2, O-ring 56 is disposed within grove 46 of lid 14. Platform 38 is then positioned on floor 28 of rotor body 12 such that threaded bolt 30 passes through aperture 42. Threaded nut 58 can then be selectively screwed onto bolt 30 so as to secure lid 14 to rotor body 12. As nut 58 is tightened, O-ring 56 produces a liquid type seal between platform 38 of lid 14 and floor 28 of rotor body 12.

Figure 3:
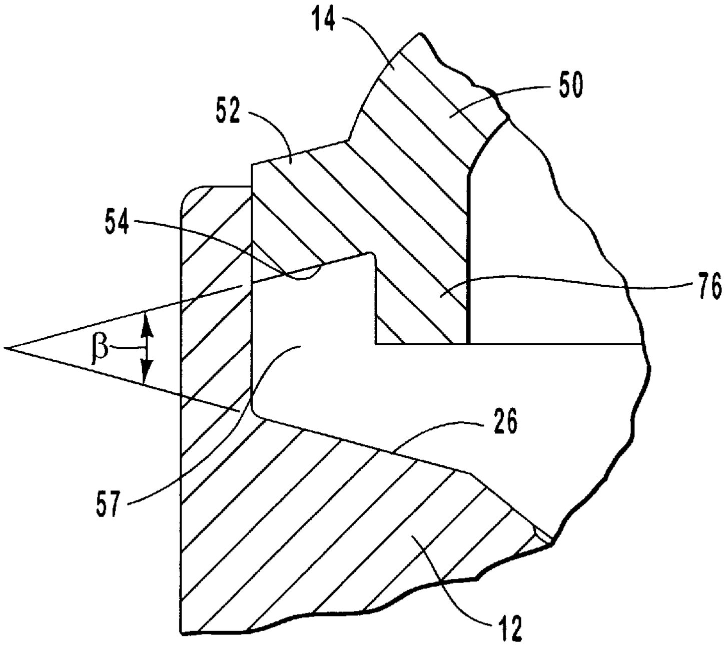
FIG. 3 is an enlarged cross-sectional side view of the juncture between the lid and rotor body of FIG. 2 with the sealing element thereof being removed.

Depicted in FIG. 2, sealing element 16 is disposed between lid 14 and rotor body 12. FIG. 3 is an enlarged cross-sectional side view of an annular gap 57 bounded by lid 14 and rotor body 12 which is configured to receive sealing element 16. As depicted therein, gap 57 is bounded in part by first bearing surface 26 and second bearing surface 54 which are vertically aligned. Each of bearing surfaces 26 and 54 are tapered so as to enclose an angle $\beta$ therebetween such that gap 57 has a wedge shaped transverse cross section that narrows in a radial outward direction. The angle $\beta$ is preferably in a range $0° < \beta < 180°$, and more preferably about 30°. In one embodiment, bearing surfaces 26 and 54 taper at substantially the same angle so that gap 57 is symmetrical. An annular first inner flange 76 projects down from outer edge 50 of lid 14 so as to at least partial bound the inside of gap 57.

Figure 4:
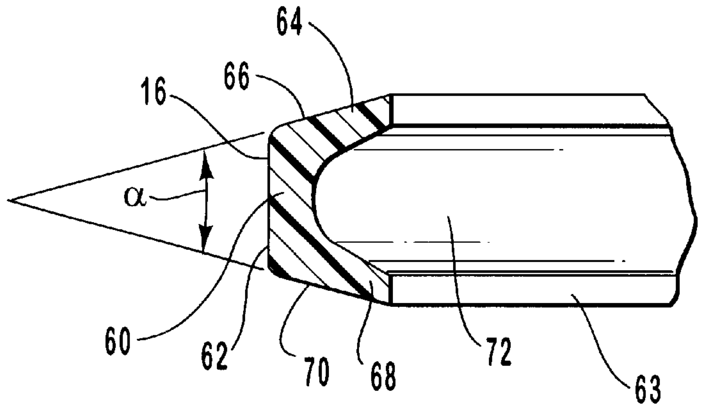
FIG. 4 is an enlarged transverse cross-sectional side view of the sealing element of FIG. 1.

Depicted in FIG. 4 is a transverse cross sectional view of sealing element 16 which is designed to be positioned within gap 57. Sealing element 16 includes an outer face 62, an opposing inner face 63, and an upper sidewall 66 and a lower sidewall 70 extending therebetween. Outer face 62 is substantially flat and vertically disposed. Sidewalls 55 and 70 are substantially flat and taper so as to enclose an angle a therebetween. The taper angle is such that sidewalls 66 and 70 form a wedge shape in transverse cross section that narrows in a radial outward direction. In an unstressed state, the angle a is preferably in a range $0°<\alpha<180°$, and more preferably about 50°.

In the embodiment depicted in FIG. 4, sealing element has a substantially U-shaped cross section which is substantially symmetrical in design. As shown therein, sealing element 16 further includes a base 60 positioned at outer face 62. Projecting inward and upward from the top end of base 60 is an annular first sealing lip 64. First sealing lip 64 is bounded on one side by annular upper sidewall 66. Projecting inwardly and downwardly from the bottom end of base 60 is an annular second sealing lip 68. Second sealing lip 68 is bounded by annular lower sidewall 70. Formed between first sealing lip 64 and second sealing lip 68 is an annular collecting grove 72.

Figure 5:
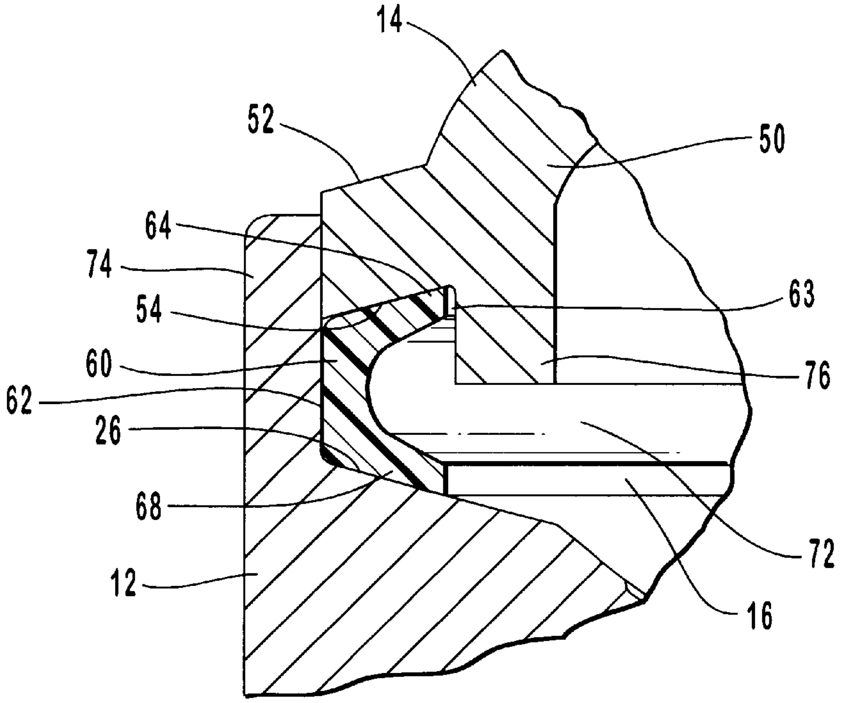
FIG. 5 is an enlarged cross-sectional side view of the detail 5—5 identified in FIG. 2.

As lid 14 is secured to rotor body 12 by nut 58, as depicted in FIGS. 2 and 5, sealing element 16 is prestressed therebetween. Specifically, first sealing lip 64 biases against second bearing surface 54 of lid 14 and second sealing lip 68 biases against first bearing surface 26 of rotor body 12. First inner flange 76 is configured so as to at least partially bound inside face 63 of of sealing element 16. First inner flange 76 facilitates stabilization of sealing element 16 and, as discussed later, conducts spilled liquids into collecting groove 72 In this position, an effective liquid tight seal is produced by sealing element 16 between lid 14 and rotor body 12 when rotor assembly 10 is in a stationary position. As such, loading region 24 in which test tubes containing samples are disposed is effectively sealed closed.

In one embodiment of the present invention, support means are provided for maintaining base 60 of sealing element 16 in position when rotor assembly 10 is subject to centrifugal rotation. By way of example and not by limitation, an annular jacket flange 74 projects upward from rotor body 12 so as to be disposed against outside face 62 of sealing element 16. Alternative embodiments of the support means will be discussed later in the disclosure.

During centrifugal rotation of rotor assembly 10, base 60 of sealing element 16 is pressed against the inside of jacket flange 74 as a result of centrifugal force. More specifically, sealing element 16 as a whole is forced back toward jacket flange 74 by the centrifugal force. As a result of bearing surface 26 and 54 being oriented in an outward narrowing wedge shape, sealing element 16 is compressed into the wedge shape under the centrifugal force. This results in an increase in the pressing power acting on sealing element 16 and thus an increase in the sealing action. Simultaneously, sealing lips 64 and 68 of sealing element 16 spread outward as a result of the centrifugal force. Accordingly, as the centrifugal force increases, the sealing effectiveness between sealing lips 64 and 68 and bearing surfaces 26 and 54 increase. A reinforcement of the sealing action due to the centrifugal force is thus obtained.

In one embodiment of the present invention, means are provided on the sealing element for collecting materials spilled within the loading region during centrifugal rotation. By way of example and not by limitation, one of the unique aspects of the present invention is annular collecting groove 72 formed on sealing element 16. Collecting groove 72 is configured such that if a liquid or other material is spilled within loading region 24, the spilled material is gathered within collecting groove 72 under the centrifugal force without detrimentally distorting sealing element 16. Accordingly, the likelihood of the spilled material leaking past sealing element 16 is decreased. In an alternative embodiment, it is possible to divide collecting groove 72 into sectors by lamellar walls. Spilled materials can also be collected in sealing element 16 by forming borings in the radial direction thereof.

Figure 6A:
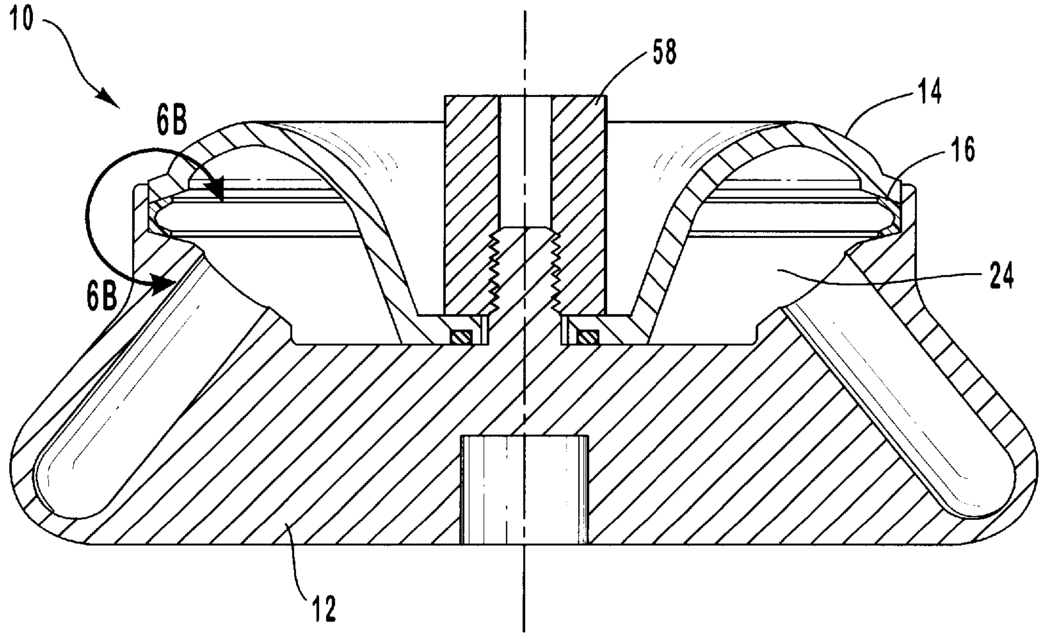
FIG. 6A is a cross-sectional side view of an alternative embodiment of the rotor assembly shown in FIG. 2, the inner flange being removed therefrom.
Figure 6B:
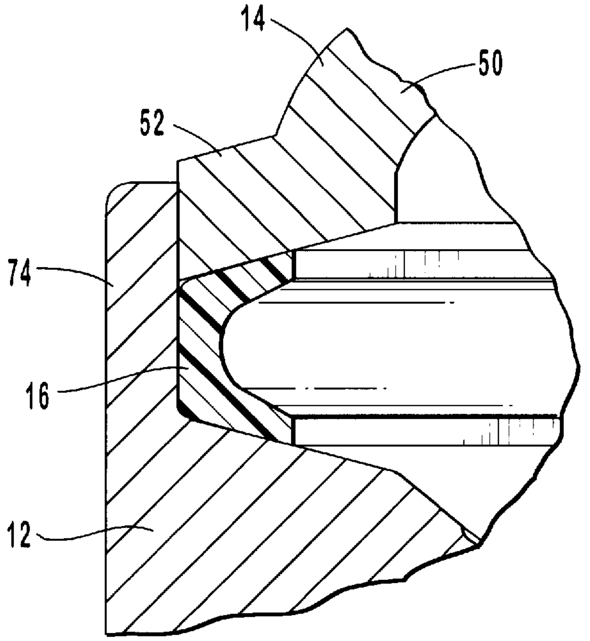
FIG. 6B is an enlarged cross-sectional side view of the detail 6B—6B identified in FIG. 6A.

Depicted in FIGS. 6A and 6B is an alternative embodiment of rotor assembly 10. In contrast to rotor assembly 10 previously discussed with regard to FIGS. 1–5, lid 14 is depicted without annular first inner flange 76.

Figure 7A:
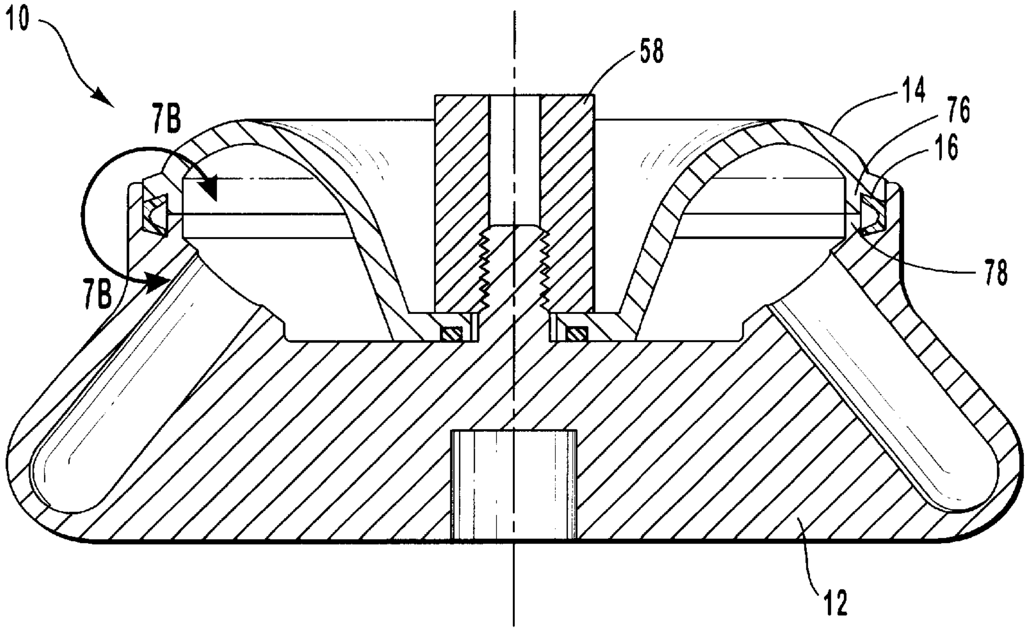
FIG. 7A is a cross-sectional side view of an alternative embodiment of the rotor assembly shown in FIG. 2, the sealing element being bounded on the inside surface by dual inner flanges.
Figure 7B:
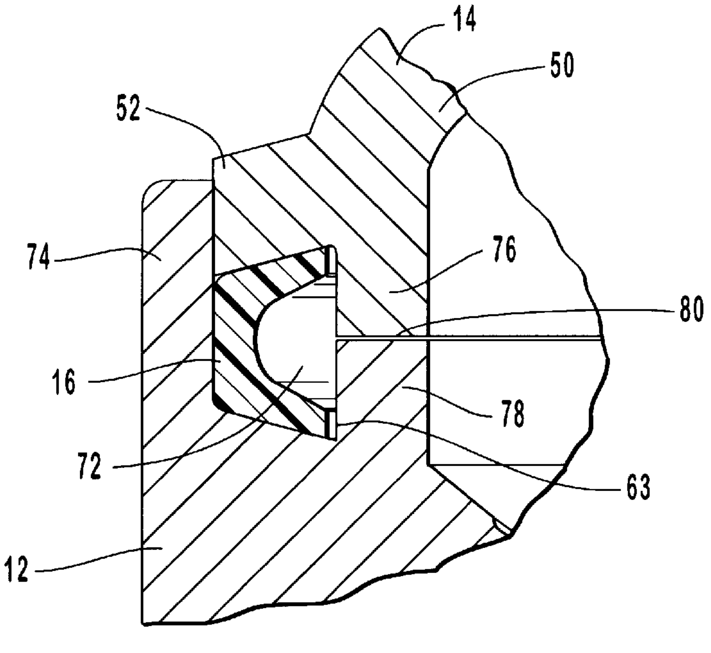
FIG. 7B is an enlarged cross-sectional side view of the detail 7B—7B identified in FIG. 7A.

Depicted in FIGS. 7A and 7B is an alternative embodiment of rotor assembly 10. In contrast to rotor assembly 10 previously discussed with regard to FIGS. 1–5, rotor body 12 includes an annular second inner flange 78 upwardly projecting in vertical alignment with first inner flange 76 and adjacent to inside face 63 of sealing element 16. First and second inner flanges 76 and 78 are configured such that there is a gap 80 therebetween when lid 14 is secured to rotor body 12. Gap 80 acts as a flow conduit which enables fluids or other materials within loading region 25 to pass therebetween and enter collecting groove 72 during centrifugal rotation.

Figure 8A:
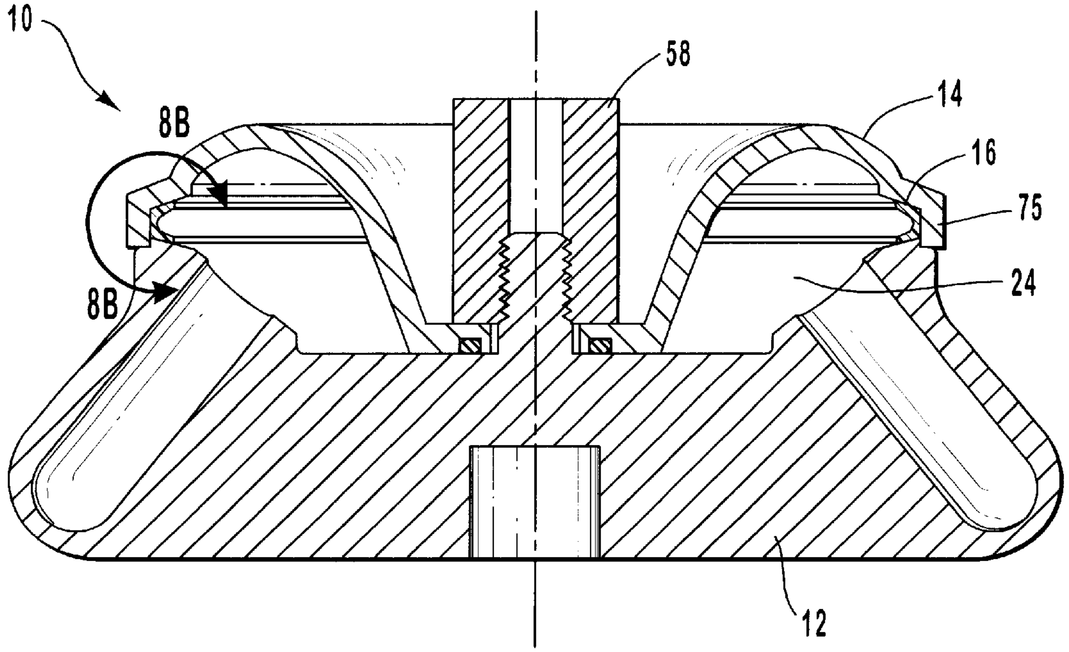
FIG. 8A is a cross-sectional side view of an alternative embodiment of the rotor assembly shown in FIG. 2, the jacket flange projecting down from the lid.
Figure 8B:
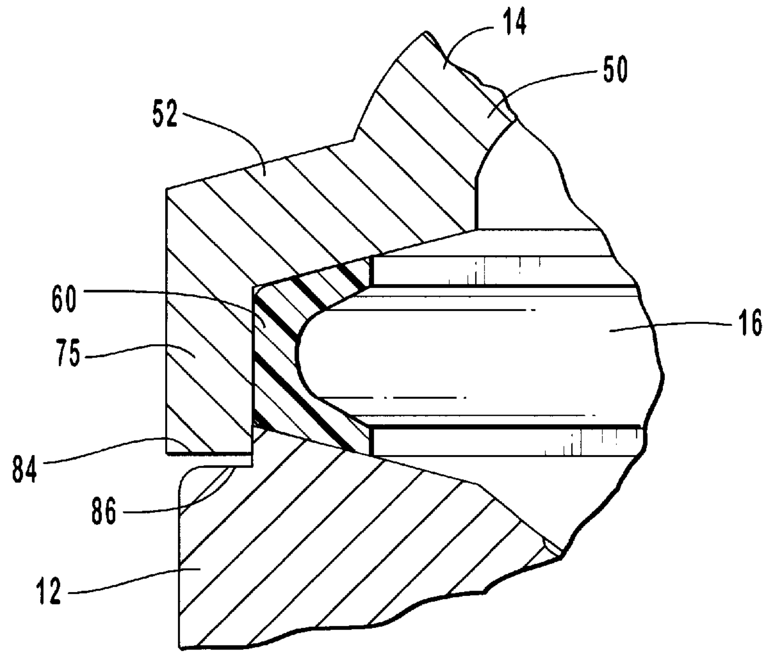
FIG. 8B is an enlarged cross-sectional side view of the detail 8B—8B identified in FIG. 8A.

Depicted in FIGS. 8A and 8B is an alternative embodiment of rotor assembly 10. In contrast to rotor assembly 10 previously discussed with regard to FIGS. 1–5, FIGS. 8A and 8B disclose an alternative embodiment of the support means for maintaining base 60 of sealing element 16 in position when rotor assembly 10 is subject to centrifugal rotation. Specifically, FIGS. 8A and 8B disclose an annular jacket flange 75 projecting downward from annular lip 52 of lid 14 rather than jacket flange 74 projecting up from rotor body 12. Jacket flange 75 terminates at a free end 84 which interlocks in a circular, graduated edge groove 86 formed on rotor body 12. Jacket flange 75 function and interacts with sealing element 16 in substantially the same way as previously discussed with regard to jacket flange 74.

Figure 9A:
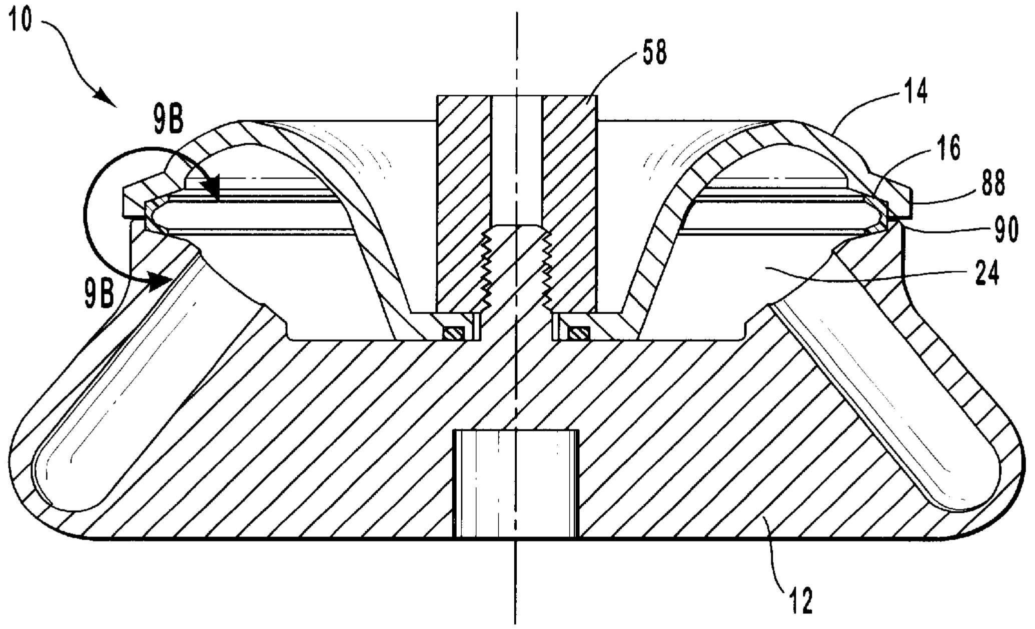
FIG. 9A is a cross-sectional side view of an alternative embodiment of the rotor assembly shown in FIG. 2, the jacket flange projecting from both the lid and the rotor body.
Figure 9B:
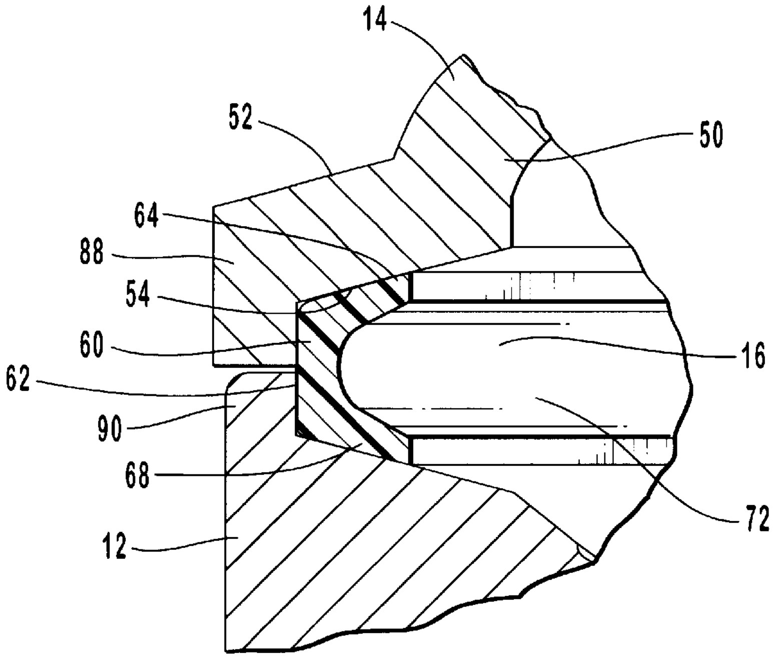
FIG. 9B is an enlarged cross-sectional side view of the detail 9B—9B identified in FIG. 9A.

Depicted in FIGS. 9A and 9B is an alternative embodiment of rotor assembly 10. In contrast to rotor assembly 10 previously discussed with regard to FIGS. 1–5, FIGS. 9A and 9B disclose an alternative embodiment of the support means for maintaining base 60 of sealing element 16 in position when rotor assembly 10 is subject to centrifugal rotation. Specifically, FIGS. 9A and 9B disclose base 60 of sealing element 16 being supported by an annular first jacket flange 88 projecting down from annular lip 52 of lid 14 and an annular second jacket flange 90 upwardly extending from rotor body 12 in vertical alignment with first jacket flange 88. Each of jacket flanges 88 and 90 terminate approximately central of outside face 62 of sealing element 16.

Accordingly, as depicted in FIG. 9B, sealing element 16 is encompassed in its upper area by first jacket flange 88 and in its lower area by second jacket flange 90. Jacket flanges 88 and 90 function and interact with sealing element 16 in substantially the same way as previously discussed with regard to jacket flange 74. That is, base 10 is supported against jacket flanges 88 and 90 while first sealing lip 64 is sealed in bias engagement against second bearing surface 54 and second sealing lip 68 is sealed in bias engagement against first bearing surface 26. Collecting groove 72 continues to function to collect any liquid that may escape from test tubes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A centrifuge rotor assembly comprising:

(a) a rotor body having a loading region encircled by a first bearing surface;

(b) a lid configured to be removably secured over the loading region of the rotor body, the lid having a second bearing surface;

(c) an annular sealing element having a base with a face formed on the outer perimeter thereof, an annular upper sidewall projecting radially inward and upward from the base, and an annular lower sidewall projecting radially inward and downward from the base, the lower sidewall biasing against the first bearing surface and the upper sidewall biasing against the second bearing surface when the lid is secured to the rotor body; and (d) support means for maintaining the base of the sealing element in position during centrifugal rotation.

2. An assembly as recited in claim 1, further comprising means formed on the sealing element for collecting materials spilled within the loading region during centrifugal rotation.

3. An assembly as recited in claim 2, wherein the means for collecting materials includes the sealing element having an inner surface with an annular collecting groove formed therein.

4. An assembly as recited in claim 1, wherein the first bearing surface and second bearing surface are configured to form a gap therebetween, the gap having a truncated wedge shaped transverse cross section that narrows in a radial outward direction when the lid is secured to the rotor body.

5. An assembly as recited in claim 1, wherein the support means comprises an annular jacket flange projecting from the lid so as to be disposed against the base of the sealing element when the lid is secured to the rotor body.

6. An assembly as recited in claim 1, further comprising an annular inner flange projecting adjacent to the inside face of the sealing element when the lid is secured to the rotor body.

7. A centrifuge rotor assembly comprising:

(a) a rotor body having a loading region encircled by a first bearing surface;

(b) a lid configured to be removably secured over the loading region of the rotor body, the lid having a second bearing surface; and (c) an annular sealing element having a substantially U-shaped transverse cross-section, the sealing element including:

(i) an annular base having a substantially flat outer face extending from an upper outside corner to a lower outside corner;

(ii) an annular first sealing lip at least partially inwardly project from the base to a first terminus, the first sealing lip having a substantially planar upper sidewall extending from the outer face of the base to the first terminus, the upper sidewall biasing against the second bearing surface of the lid when the lid is secured to the rotor body;

(iii) an annular second sealing lip at least partially inwardly project from the base to a second terminus, the second terminus being spaced apart from the first terminus, the second sealing lip having a substantially planar lower sidewall extending from the outer face of the base to the second terminus the lower sidewall biasing against the first bearing surface of the rotor body; and (iv) an annular collecting groove formed between the first sealing lip and the second sealing lip.

8. A centrifuge rotor assembly as recited in claim 7, wherein the first sealing lip and the second sealing lip are substantially symmetrically disposed relative to a plane horizontally extending between the first sealing lip and the second sealing lip when the centrifuge rotor is in a upright position.

9. A centrifuge rotor assembly comprising:

(a) a rotor body having a loading region encircled by an annular sloped first bearing surface;

(b) a lid configured to be removably secured over the loading region of the rotor body, the lid having an annular sloped second bearing surface, the first bearing surface and the second bearing surface being separated from each other along their entire lengths so as to form a gap therebetween when the lid is secured to the rotor, the gap having a truncated wedge shaped transverse cross section that narrows in a radial outward direction when the lid is secured to the rotor body;

(c) an annular sealing element having a substantially U-shaped transverse cross-section, the sealing element including an annular base having an annular first sealing lip and an annular second sealing lip projecting inward therefrom, the sealing lips bounding an annular collecting groove formed therebetween, the first sealing lip biasing against the first bearing surface of the rotor body when the lid is secured to the rotor body; and (d) an annular jacket flange positioned adjacent to the base of the sealing element when the lid is secured to the rotor body, the jacket flange projecting from the rotor body or lid at a location spaced apart from the other of the rotor body or lid.

10. An assembly as recited in claim 9, wherein the loading region has a plurality of test tube recesses formed therein.

11. An assembly as recited in claim 9, wherein the first sealing lip and the second sealing lip inwardly project at diverging angles.

12. An assembly as recited in claim 9, further comprising an annular inner flange disposed adjacent to at least a portion of an inside face of the sealing element.

13. An assembly as recited in claim 12, wherein the inner flange projects from the select element chosen from the lid and the rotor body.

14. A centrifuge rotor assembly comprising:

(a) a rotor body having a loading region encircled by an annular sloped first bearing surface, the loading region including a plurality of test tube recesses;

(b) a lid configured to be removably secured over the loading region of the rotor body, the lid having an annular sloped second bearing surface, the first bearing surface and second bearing surface being configured to form a gap therebetween, the gap having a substantially trapezoidal wedge shaped transverse cross section that narrows in a radial outward direction when the lid is secured to the rotor body;

(c) an annular sealing element disposed within the gap between the lid and the rotor body, the sealing element including an annular base having an annular first sealing lip and an annular second sealing lip inwardly projecting therefrom at diverging angles, the sealing lips bounding an annular collecting groove formed therebetween, the collecting groove being in fluid communication with the loading region; and (d) support means for maintaining the base of the sealing element in position during centrifugal rotation.

15. An assembly as recited in claim 14, wherein the support means comprises an annular first jacket flange projecting from the lid adjacent to the base of the sealing element and a second jacket flange projecting from the rotor body adjacent to the base of the sealing element.

16. An assembly as recited in claim 14, further comprising an annular inner flange disposed adjacent to at least a portion of an inside face of the sealing element.

17. An assembly as recited in claim 14, wherein the first sealing lip and the second sealing lip are configured to spread apart under centrifugal rotation of the rotor assembly.

18. An assembly as recited in claim 14, wherein the sealing element is symmetrical when viewed from a transverse cross section relative to a horizontal plane extending between the first bearing surface and the second bearing surface.

19. A centrifuge rotor assembly comprising:

(a) a rotor body having a loading region encircled by an annular first bearing surface;

(b) a lid configured to be removably secured over the loading region of the rotor body, the lid having an annular second bearing surface, the first bearing surface and second bearing surface being configured to form a gap therebetween when the lid is secured to the rotor body;

(c) an annular sealing element disposed within the gap between the lid and the rotor body, the sealing element including an annular base, an annular first scaling lip inwardly projecting from the base to a first terminus, and an annular second sealing lip inwardly projecting from the base to a second terminus, the sealing lips bounding an annular collecting groove formed therebetween, the collecting groove being in fluid communication with the loading region;

(d) an annular inner flange projecting from the lid or rotor body, the annular inner flange covering the first terminus or the second terminus when the lid is secured to the rotor, the inner flange being configured such that at least a portion of the collecting groove is openly exposed in horizontal alignment with the loading region of the rotor body when the rotor body is vertically disposed for normal operation; and (e) an annular outer jacket flange positioned adjacent to the base of the sealing element when the lid is secured to the rotor body, the jacket flange projecting from the rotor body or lid.

* * * * *